US008825109B2

(12) United States Patent
Montemurro et al.

(10) Patent No.: US 8,825,109 B2
(45) Date of Patent: Sep. 2, 2014

(54) POLICY-BASED DATA ROUTING FOR A MULTI-MODE DEVICE

(75) Inventors: Michael Montemurro, Toronto (CA); Nicholas Alfano, Stratford-Upon-Avon (GB); John-Luc Bakker, Keller, TX (US); Richard George, Waterloo (CA); Brian Alexander Oliver, Fergus (CA)

(73) Assignee: BlackBerry Limited, Waterloo (CA)

( * ) Notice: Subject to any disclaimer, the term of this patent is extended or adjusted under 35 U.S.C. 154(b) by 690 days.

(21) Appl. No.: 12/032,145

(22) Filed: Feb. 15, 2008

(65) Prior Publication Data

US 2009/0207817 A1 Aug. 20, 2009

(51) Int. Cl.
*H04M 3/00* (2006.01)
*H04W 40/00* (2009.01)
*H04M 1/00* (2006.01)
*H04B 1/38* (2006.01)

(52) U.S. Cl.
USPC ........ 455/552.1; 455/418; 455/445; 455/557; 370/338

(58) Field of Classification Search
USPC ................ 455/552.1, 428, 423.1, 435.2–445, 455/41.1, 41.2, 523, 524, 553.1, 418–420, 455/434, 436, 438, 444, 452.2, 453, 466, 455/525, 550.1, 556.2, 557, 560–561, 455/522.1; 370/237–238, 328–329, 338, 370/341, 352, 356, 397–399, 395.3–395.31, 370/395.5–395.51
See application file for complete search history.

(56) References Cited

U.S. PATENT DOCUMENTS

| | | | | |
|---|---|---|---|---|
| 6,333,918 B1 * | 12/2001 | Hummel | ................ | 370/238 |
| 6,449,251 B1 * | 9/2002 | Awadallah et al. | ........... | 370/229 |
| 6,771,964 B1 | 8/2004 | Lahtinen et al. | | |
| 6,782,429 B1 | 8/2004 | Kisor | | |
| 6,801,777 B2 | 10/2004 | Rusch | | |
| 6,895,558 B1 * | 5/2005 | Loveland | ............... | 715/746 |
| 6,961,583 B2 | 11/2005 | Moles et al. | | |

(Continued)

FOREIGN PATENT DOCUMENTS

| | | |
|---|---|---|
| CA | 2589961 | 11/2007 |
| EP | 1526682 | 4/2005 |

(Continued)

OTHER PUBLICATIONS

Inoue, Masugi, et al. ; Prototype of Context-Based Adaptive Communication System on Seamless Networking Platform; IEEE, 2004, pp. 1070-1074. http://ieeexplore.ieee.org/Xplore/login.jsp?url=/iel5/9435/29981/01373863.pdf?arnumber=1373863.

(Continued)

*Primary Examiner* — Meless Zewdu
*Assistant Examiner* — Michael Nguyen
(74) *Attorney, Agent, or Firm* — Hanley, Flight & Zimmerman, LLC.

(57) ABSTRACT

Communication devices capable of at least two communication modes (e.g. WLAN, WMAN and WWAN and/or wired modes) can be configured to optimize communications using a policy-based mechanism to configure connections and routes. A rules engine evaluates its policies on a state change (e.g. network availability, time of day, etc.) to configure a routing table and, together with communication APIs, provides an appropriate connection to an application for its respective communications. Policies may be responsive to various factors such as Radio Access Technology (high/low bandwidth), cost, presence, time of day, location, application type and quality of service (QoS) requirements among others to optimize communications.

20 Claims, 6 Drawing Sheets

(56) References Cited

U.S. PATENT DOCUMENTS

| | | | |
|---|---|---|---|
| 6,973,502 B2 | 12/2005 | Patil | |
| 6,978,138 B2 | 12/2005 | Japenga et al. | |
| 7,047,037 B2 | 5/2006 | Ormson | |
| 7,657,282 B2* | 2/2010 | Suzuki et al. | 455/552.1 |
| 7,702,357 B2* | 4/2010 | Yam | 455/552.1 |
| 7,761,098 B1* | 7/2010 | Nguyen et al. | 455/435.2 |
| 7,996,505 B2* | 8/2011 | Krantz et al. | 709/223 |
| 2002/0059090 A1 | 5/2002 | Yanagimachi | |
| 2002/0059453 A1 | 5/2002 | Eriksson et al. | |
| 2003/0100308 A1 | 5/2003 | Rusch | |
| 2004/0002329 A1 | 1/2004 | Bhatia et al. | |
| 2004/0009751 A1* | 1/2004 | Michaelis et al. | 455/62 |
| 2004/0081202 A1 | 4/2004 | Minami et al. | |
| 2004/0131078 A1 | 7/2004 | Gupta et al. | |
| 2005/0117544 A1 | 6/2005 | Goris et al. | |
| 2005/0278448 A1 | 12/2005 | Mazor | |
| 2006/0083193 A1* | 4/2006 | Womack et al. | 370/328 |
| 2006/0142067 A1 | 6/2006 | Adler | |
| 2006/0159088 A1* | 7/2006 | Aghvami et al. | 370/389 |
| 2006/0182045 A1 | 8/2006 | Anderson | |
| 2006/0268711 A1* | 11/2006 | Doradla et al. | 370/235 |
| 2007/0115899 A1 | 5/2007 | Ovadia et al. | |
| 2007/0211624 A1 | 9/2007 | Schmidt et al. | |
| 2007/0255797 A1* | 11/2007 | Dunn et al. | 709/217 |
| 2007/0255831 A1 | 11/2007 | Hayashi et al. | |
| 2007/0271598 A1 | 11/2007 | Chen et al. | |
| 2008/0057918 A1 | 3/2008 | Abrant et al. | |
| 2008/0102815 A1* | 5/2008 | Sengupta et al. | 455/424 |
| 2008/0253366 A1* | 10/2008 | Zuk et al. | 370/389 |
| 2008/0261630 A1 | 10/2008 | Wormald et al. | |
| 2009/0070166 A1 | 3/2009 | Lashus et al. | |
| 2009/0191841 A1* | 7/2009 | Edge et al. | 455/404.1 |
| 2009/0274090 A1 | 11/2009 | Akhtar et al. | |

FOREIGN PATENT DOCUMENTS

| | | | |
|---|---|---|---|
| EP | 1526682 | A2 | 4/2005 |
| EP | 1926283 | A1 | 5/2008 |
| FR | 2865599 | | 7/2005 |
| GB | 2346507 | A | 8/2000 |
| GB | 2436187 | A | 9/2007 |
| WO | 0203733 | A1 | 1/2002 |
| WO | 2004/008793 | A | 1/2004 |
| WO | 2004008793 | | 1/2004 |
| WO | 2004040931 | A3 | 5/2004 |
| WO | 2005117463 | A2 | 12/2005 |
| WO | 2006098599 | A1 | 9/2006 |
| WO | 2007036764 | A1 | 4/2007 |
| WO | 2008/011420 | A | 1/2008 |
| WO | 20080011420 | A1 | 1/2008 |

OTHER PUBLICATIONS

WirelessMoves, Thoughts on the evolution wireless networks and the mobile web 2.0 http://mobilesociety.typepad.com/mobile_life/2007/03/deep_inside_the.html.

Tianzhou, Chen, et al.; Unified Mobile Protocol Stack With Network Sub-Protocol Component Framework; Proceedings of the 23rd Iasted International Multi-Conference, Parallel and Distributed Computing and Networks, Feb. 15-17, 2005, Innsbruck, Austria, pp. 64-69. http://www.actapress.com/PaperInfo.aspx?PaperID=19175&reason=500.

Resource Management Techniques and Guidelines for Implementation, pp. 169-172. http://books.google.com/books?id=dZttjsVpy0QC&pg=PA170&lpg=PA170&dq=cell+or+network+or+rat+and+(reselection%7Crank%7Corder)+-patent&source=web&ots=fzfDZ12mwH&sig=bKZqhPIMP46sfEkS3YoD-PAahQQ#PPA169,M1.

Northstream, Operator Options Beyond 3G, Whitepaper, Feb. 2005, pp. 1-30. http://www.3gamericas.org/pdfs/northstream_operator_options_beyond3G_feb2005.pdf.

Andrea Acquaviva, et al., "Server Controlled Power Management for Wireless Portable Devices", Mobile and Media Systems Laboratory, HP Laboratories Palo Alto, HPL-2003-82, Apr. 17, 2003.

W. Qadeer, et al., "Heterogeneous Wireless Network Management", Stanfor University, HP Labs.

European Patent Office, Extended European Search Report issued in EP Patent Application 11169639.9, Jan. 24, 2012, 7 pages.

European communication for corresponding European Application No. 08151541.3-2416/2091190 dated Mar. 4, 2010.

EP Examination Report for EP Application No. 08 151 541.3-2416.

Extended European Search Report dated Oct. 21, 2011. In corresponding application No. 11169640.7.

Extended European Search Report dated Oct. 5, 2011 issued by the European Patent Office relating to corresponding European Patent Application No. 11169638.1.

Thomas Stockhammer, et al. On Practical Crosslayer Aspects in 3GPP Video Services, International Multimedia Conference, Augsburg, Bavaria, Germany, 2007, (http://portal.acm.org/citation.cfm?id=1290053).

Canadian Office Action, Issued Aug. 10, 2011, in corresponding Canadian Application No. 2,653,862, pp. 1-4.

Canadian Intellectual Property Office, Office action issued in Canadian patent application No. 2,653,862, dated Nov. 21, 2012, 3 pages.

European Patent Office, Communication pursuant to Article 94(3) EPC issued in European patent application No. 11169640.7, dated Nov. 15, 2012, 4 pages.

United States Patent and Trademark Office, Office action issued in U.S. Appl. No. 13/244,870, dated Oct. 23, 2012, 14 pages.

European Patent Office, Communication pursuant to Article 94(3) EPC issued in European patent application No. 11169638.1, dated Jan. 2, 2013, 5 pages.

United States Patent and Trademark Office, Office action issued in U.S. Appl. No. 13/244,870, dated Nov. 10, 2011, 10 pages.

United States Patent and Trademark Office, Office action issued in U.S. Appl. No. 13/244,870, dated Mar. 15, 2012, 12 pages.

United States Patent and Trademark Office, Office action issued in U.S. Appl. No. 13/244,870, dated May 15, 2012, 10 pages.

United States Patent and Trademark Office, Office action issued in U.S. Appl. No. 13/244,870, dated Apr. 11, 2013, 19 pages.

Canadian Intellectual Property Office, Office action issued in connection with Canadian Application No. 2,653,862, dated Mar. 7, 2014, 4 pages.

United States Patent and Trademark Office, Final Office Action issued in connection with U.S. Appl. No. 13/244,870, dated Jun. 5, 2014, 35 pages.

\* cited by examiner

POLICY-BASED DATA ROUTING FOR A MULTI-MODE DEVICE

FIELD

The present invention relates generally to a system and method for operation of a multi-mode wireless communication device and more particularly to policy-based routing of communications among two or more modes of wireless communication.

BACKGROUND OF THE INVENTION

Due to the proliferation of wireless networks, there are a continually increasing number of wireless devices in use today. These devices include mobile telephones, smart phones, personal digital assistance (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries.

With the advent of dual or multi-mode devices (for example, devices with radio access technologies that provide access to wireless local area networks (WLAN) (e.g. access technologies under the Wi-Fi brand), wireless metropolitan area network (WMAN) (e.g. access technologies under the WiMAX brand) and wireless wide area networks (WWAN) (e.g. cellular technologies like GSM/GPRS EDGE, UTMS, HSPA, CDMA, WCDMA, etc.) applications can have the ability to offer different usage models depending on the mode of wireless operation selected. Selection among the different radio access technologies may be driven by the different properties of the technologies such as bandwidth, range, cost, and power consumption, among other considerations. Selection may be an initial selection of a technology or a re-selection/evaluation particularly in view of a change to real-time conditions.

For instance, on a dual mode device, carrier voice traffic content can be accessed over GSM radio, while enterprise voice traffic content can be accessed over a WLAN radio. For a browsing application on the device, website content can be accessed from a WLAN, WMAN or WWAN (e.g. GPRS or EDGE) network. There are costs associated with application access from these different networks. There are also quality considerations such as the speed at which content can be delivered, or in the case of streaming media, the quality of service at which the content is delivered. It is therefore desirable to have a mechanism that seeks to optimize communications for multi-mode capable devices, that is, that seeks to improve communications for multi-mode capable devices.

BRIEF DESCRIPTION OF THE DRAWINGS

An embodiment of the invention will now be described by way of example only with reference to the following drawings in which.

For convenience, like numerals in the description refer to like structures in the drawings.

DETAILED DESCRIPTION OF THE PREFERRED EMBODIMENT

Wireless communication devices capable of communicating in at least two network communication modes (e.g. WLAN such as Wi-Fi, WMAN such as WiMAX and WWAN such as GSM/GPRS cellular and wired modes (e.g. LAN, among others)) can be configured to optimize communications using a policy-based mechanism to configure connections and routes. A rules engine evaluates its policies on a state change (e.g. network availability, time of day, etc.) to configure a routing table and, together with communication APIs, provides an appropriate connection to an application for its respective communications. Policies may be responsive to various factors such as Radio Access Technology, high/low bandwidth, cost, presence, time of day, location, application type and quality of service (QoS) requirements among others, to optimize communications.

Figure 1:
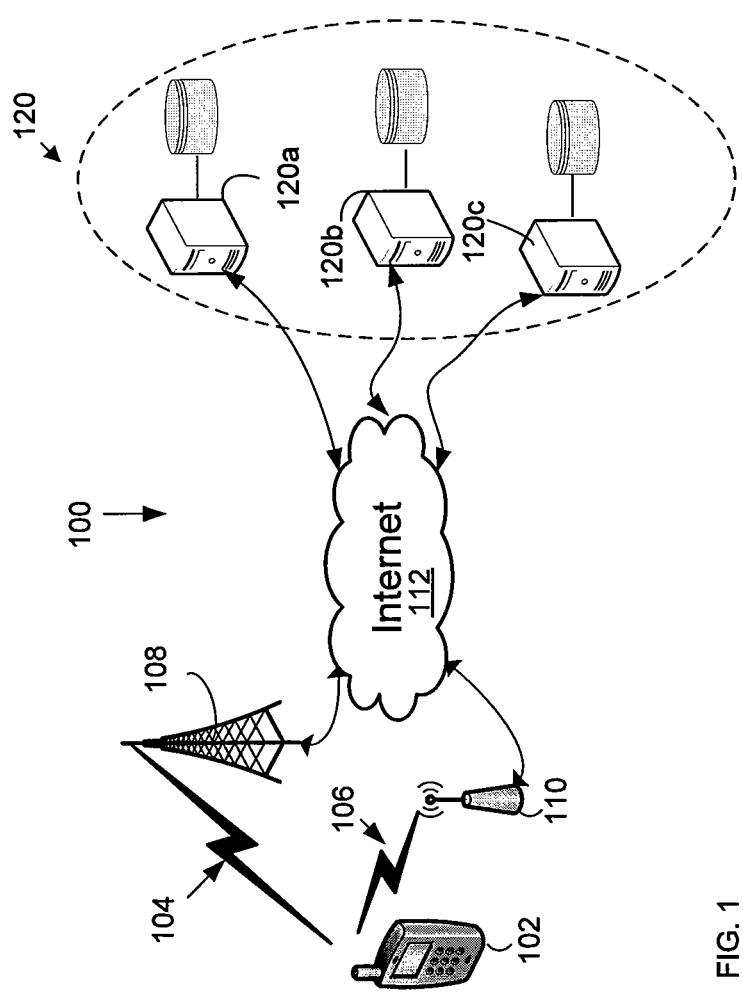
FIG. 1 is a block diagram showing an example communication network.

Referring to FIG. 1, an example communication network 100 is illustrated generally. Communication network 100 comprises a mobile wireless communication device 102, or simply mobile device 102, coupled for wireless communication via at least one wireless communication network (e.g. 104 and 106) to at least one of a plurality of backend servers 120a, 120b and 120c (collectively 120). For simplicity, the drawings and description refer to a single mobile wireless communication device 102 whereas in practice and as would be understood to a person of ordinary skill, a plurality of such devices are typically present in the network 100. A particular mobile device 102 may comprise various computing devices such as a desktop computer, a laptop or other portable computer, a smart phone, a personal digital assistant (PDA), and the like.

In the example network 100, mobile device 102 is capable of wireless communication in accordance with WLAN or WMAN (e.g. Wi-Fi or WiMAX) and WWAN (e.g. GSM Cellular) standards. As such, it may communicate through cellular network 104 and a representative base station 108 coupled to the Internet 112 and/or through WLAN or WMAN network 106 and its access point 110 also coupled to Internet 112. Servers 120 are also coupled to Internet 112. Though shown as communicating through the public Internet 112, other network configurations will be apparent to persons of ordinary skill in the art. For example, one or more backend servers 120 may be accessible to device 102 over a LAN, such as an enterprise LAN (not shown).

For simplicity, various network infrastructure (e.g. for wireless carriers and enterprises, including gateways, firewalls, etc.) is not shown. By way of example, there may be an application gateway (not shown) comprising a gateway server, a provisioning server, a discovery server and an application repository. The gateway server may be in communication with both the provisioning server and the discovery server. The gateway server is further in communication (e.g. via a public network like Internet 112 or a private network) with at least some of the plurality of the backend servers 120 that provide desired services such as Web services, database services, as well as other event source services. The gateway server may act as a message broker between the device 102 and the backend servers 120. By way of example, a Web service may provide media content (e.g. music or other audio, video, etc.) for downloading to the mobile device 102. The service may provide notifications of new content and an interface to obtain same where these notifications are push asynchronously and unsolicited to device 102 via a Push server (not shown). Notifications may be relatively light in their communication requirements while content downloading is relatively heavy (higher bandwidth and costs). A database service may have similar requirements when exchanging large amounts of data with the device 102.

Further services provided to device 102 by network infrastructure that is not shown may include:

Administrative and Management Service dealing with policies, such as those specifying allowed applications for users, services available to applications and more;

Provisioning Service controls and manages which applications users can download to a mobile devices;

Data Optimization Service transforms data for efficient wireless transmission and use on mobile devices;

Connection Service provides TCP/IP and HTTP-based connectivity between the device and other applications e.g. for browsing;

Application Integration Service supports the integration of and data transmission between device applications and backend servers 120;

Application Repository centrally manages published applications; and

Mobile IP Home and Foreign Agent Services permitting a mobile device to attach to an IP network via a home and foreign network and continue to receive packets sent to the device's home network IP address. When the device is attached via a foreign network, a home agent on the device's home network captures and encapsulates packets for the device and tunnels them to the device via a foreign agent on the foreign network.

Multi-mode component-based applications for execution in a network communication infrastructure supporting component-based applications and tools for programming same are described in U.S. patent application Ser. No. 11/763,630, filed Jun. 16, 2007 by the present assignee herein and entitled "Device For Communicating In Multiple Modes Using Multi-Mode Applications" which is incorporated herein by reference.

Figure 2:
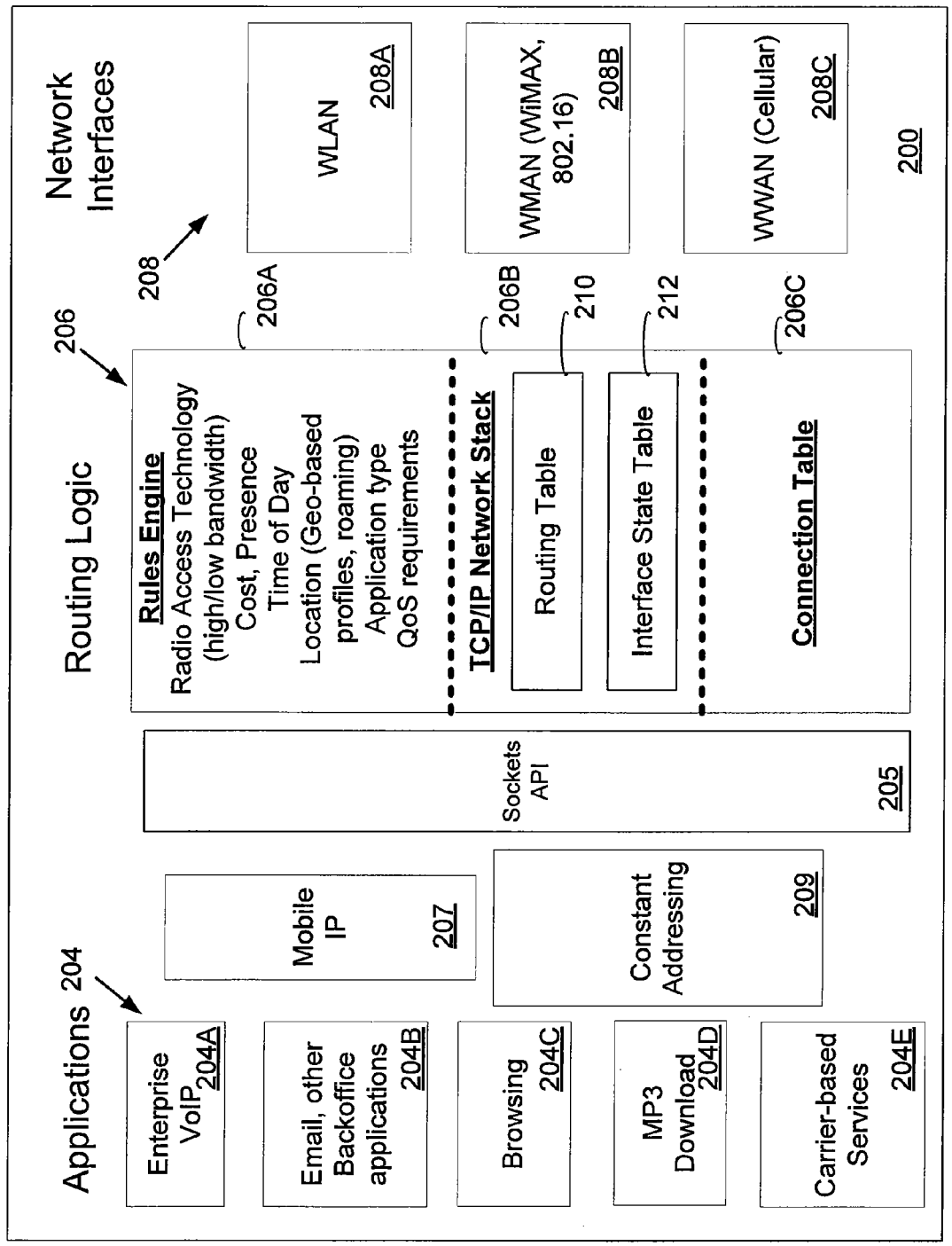
FIG. 2 is a block diagram of policy-based data routing for multi-mode operations of a device for the communication network infrastructure of FIG. 1.

With the advent of dual-mode and multi-mode devices combining communication technologies, applications can be developed and operated to provide different usage models that may vary depending on the mode of operation that is available at runtime. FIG. 2 illustrates, in accordance with an embodiment thereof, a block diagram of policy-based data routing for multi-mode operations of device 102 for communication network infrastructure of FIG. 1.

FIG. 2 shows a view of a run-time store (e.g. RAM) 200 of device 102 comprising, broadly, a plurality of applications 204, routing logic 206 and network interfaces 208. It is understood that store 200 (an example of a computer readable storage medium) may include other software (instructions and data) than is shown, including, for example, an operating system and other interfaces. In the example that is FIG. 2, applications 204 include enterprise VoIP application 204A for voice over IP communications in an enterprise data network such as a LAN; email and other back office applications 204B that communicate typically non-voice data; browsing application 204C such as a Web browser, MP3 Download 204D for acquiring audio or other media files and carrier-based services 204E such as SMS and voice communications over a carrier network.

For convenience and the present example, networks 104 and 106 are primarily IP-based. Applications 204 may require connection oriented communications e.g. using transmission control protocol (TCP) at the transport layer over the IP network (TCP/IP) and/or connectionless communication e.g. using User Datagram Protocol (UDP) over the IP network.

Routing logic 206 includes a rules engine 206A (sometimes called an inference engine) as a policy-based mechanism using rules to configure TCP/IP network stack 206B and connection table 206C to coordinate communications for applications 204 using communications interfaces (also referenced as network interfaces) 208. An IT administrator, for example, can create a policy to add a WLAN network profile to a device (a WLAN profile is configured with the SSID, security credentials, etc.). The IT Administrator can also create a policy to disable or enable an application for a user. A rule is a specific policy that is entered in the "rules engine" for carrying out the policy.

In the example device 102, network interfaces 208 include an interface for each of WLAN 208A, WMAN 208B and WWAN 208C network communications. Though not shown, other network interfaces could include short-range wireless interfaces (e.g. BlueTooth® wireless) and interface(s) for wired network communications (e.g. serial interfaces such as USB, RS 232, etc.). Though the examples are discussed in relation to multiple wireless modes, persons of ordinary skill in the art will appreciate that the multi-mode configurations and operations described herein can also include wired modes.

Rules engine 206A configures the communication operations with a set of rules/policies that could include various factors such as radio access technology (e.g. for high/low bandwidth properties), cost, presence, time of day, location (e.g. geo-based policies, network roaming), destination IP address, application type, and Quality of Service (QoS) requirements, among others. A natural language example of a policy rule could be "the MP3 download application 204D runs on the lowest cost network 104 and 106 available". Another example could be that "the CRM application (i.e. one of 204B) only synchronizes the sales contact database (e.g. 120B) over a WLAN network 106".

The TCP/IP network stack 206A includes a routing table 210 and an interface state table 212. The interface state table 212 updates as device 102 connects and disconnects with the access network 104 or carrier network 106. In a similar manner, the routing table 210 updates according to which interfaces 208 are available. For instance, if both the WLAN and WWAN radios (FIG. 6) of device 102 are connected to their respective networks 104 and 106, there will be a route associated with each network 104 and 106 that would look like:

| Source IP | Destination IP | Device Interface (208) |
|---|---|---|
| 192.168.1.20 | 0.0.0.0 | WLAN (208A) |
| 67.69.20.142 | 0.0.0.0 | WWAN (208C) |

When an IP packet is destined for transmission, the TCP/IP network stack software 206B matches the IP header of the packet to an entry in the routing table 210. That match will determine which network interface 208 will be used for transmission of the packet.

Connection table 206C manages connections from applications 204 on the device to remote applications on devices coupled via the networks 104 and 106. Connection table 206C has a respective entry corresponding to each application connection. For instance, a connection to a remote enterprise server (e.g. for email or back office application 204B) would have its own specific entry in the connection table. The entries include the source IP, the destination IP, and the TCP or UDP port number. An example connection table looks like:

| Source IP | Destination IP | Local Port | Remote Port |
|---|---|---|---|
| 192.168.1.20 | 129.24.36.244 | 1023 | 21 (MP3 download by FTP) |
| 67.69.20.142 | 29.164.236.32 | NNN | NNNN (enterprise appln.) |

Typically, communications for applications 204 are performed in one of two ways. One is socket-based using a socket-based application programming interface (API) 206 for communications. The application "delegates" communication details (set-up and tear down, etc. and management) to the socket. The other is a raw protocol connection where an application builds IP packets for transmission to another device on the network 104 or 106. A socket-based connection uses the connection table and the routing table to determine how an IP packet will be transmitted on a network 104 and 106. A raw connection uses only the routing table 210 to determine how an IP packet will be transmitted on the network 104 or 106. The connection is maintained by the particular application and not by the connection table 206C and its associated software.

In accordance with the present embodiment, rules engine 206A configures (i.e. modifies, periodically in response to changes of state and the evaluation of its rules) connection table 206C and routing table 210 to optimize the flow of communications over multiple communications modes (e.g. interfaces 208 and respective networks 104 and 106).

On a state change (for example, based on a time of day, or the connecting/disconnecting of device 102 with a specific network 104 and 106), rules engine 206A executes and modifies, as applicable, the routing table 210 to ensure that data goes out the most appropriate network (via respective interface 208). Rules engine 206A also interacts with the connection API's to determine which interface would be best used to service a particular application.

Though not shown, a user interface may be provided on the device for a user and/or device administrator to configure rules for rules engine 206A. Rules may be configured off-device (e.g. by a user and/or administrator) and transferred to the device via a communications interface. Such a transfer may be in association with the installation of an application or service provisioning of the device or upon an update or other event. For example, a group of devices may be administered by an enterprise administrator and rules therefore defined by the administrator for such devices.

Device 102 optionally has mobile IP capabilities (e.g. via component 207) to permit the device to attach to the Internet (IP network) via a home and one or more foreign networks (not shown). Mobile IP capabilities allow a mobile device to receive packets sent to its home network IP address when the device is attached via a foreign network and has a different IP address (a care-of-address) on that network. A home agent on the home network can intercept packets for the device, encapsulate and tunnel them to the mobile device via a foreign agent maintaining the care-of-address for the device. The mobile device may register the care-of-address of the foreign network with the device's home agent upon attaching via the foreign network. Applications may communicate transparently as the device moves between addresses on different networks and need not be aware of the device's IP address.

Device 102 optionally has other constant addressing capabilities (e.g. via component 209) such as a unique personal identifier addressing (PIN) capability that permits routing of a message using the device's PIN through at least a portion of the network. Such addressing permits an application communicating via the network such as sending and receiving messages to avoid any dependency or need to be aware of an underlying IP address of a connection and thus preserve transparency during an access technology switch. Network infrastructure associates the device's constant PIN and varying IP address as the device moves about the IP network. One commercial example is PIN to PIN messaging using the BlackBerry® PIN and BlackBerry® network infrastructure provided by Research In Motion Ltd. Thus components 209 and 207 each provide network addressing transparency to applications.

Figure 3:
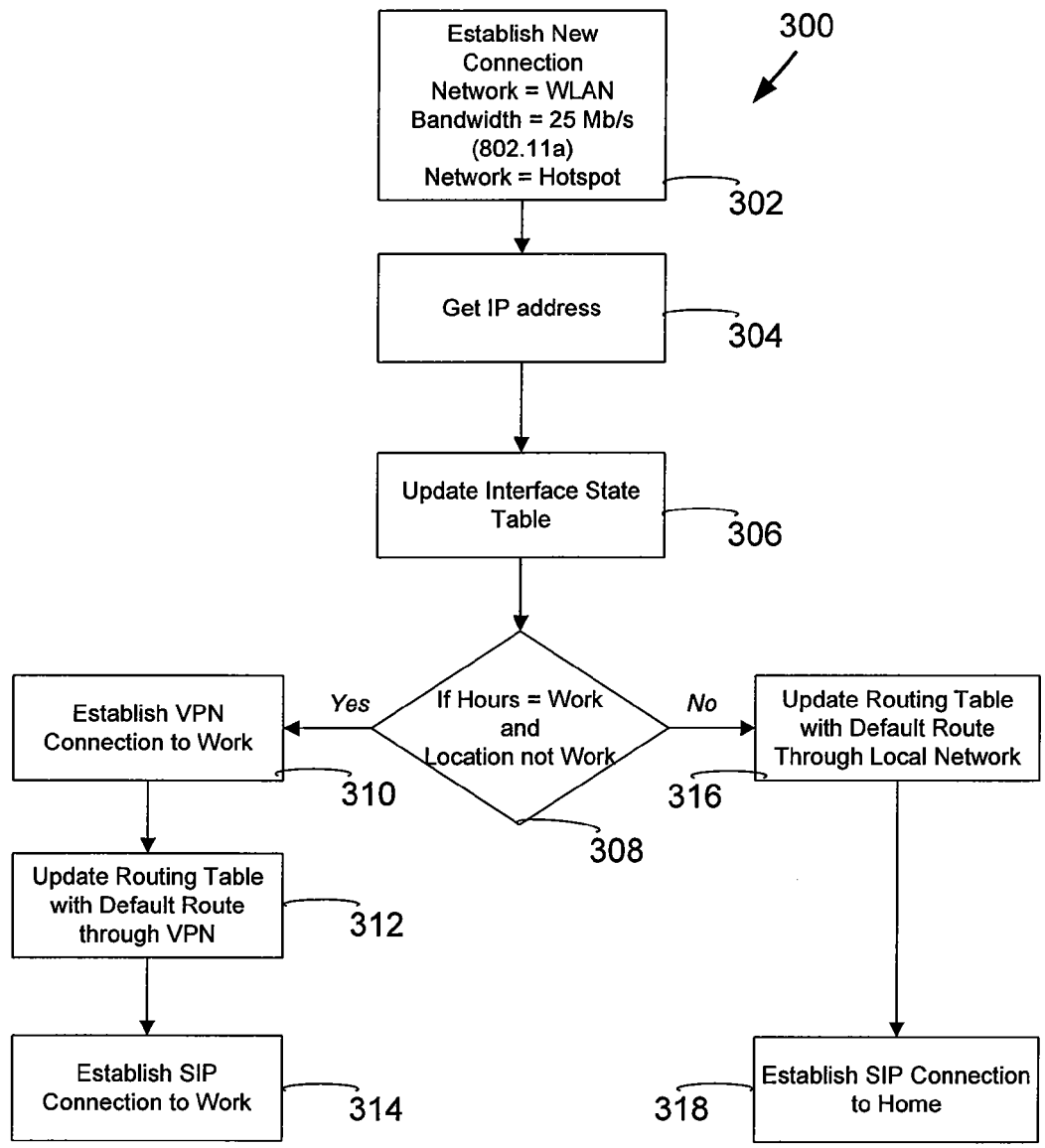
FIGS. 3 to 5 are flowcharts showing operations of policy-based data routing.
Figure 4:
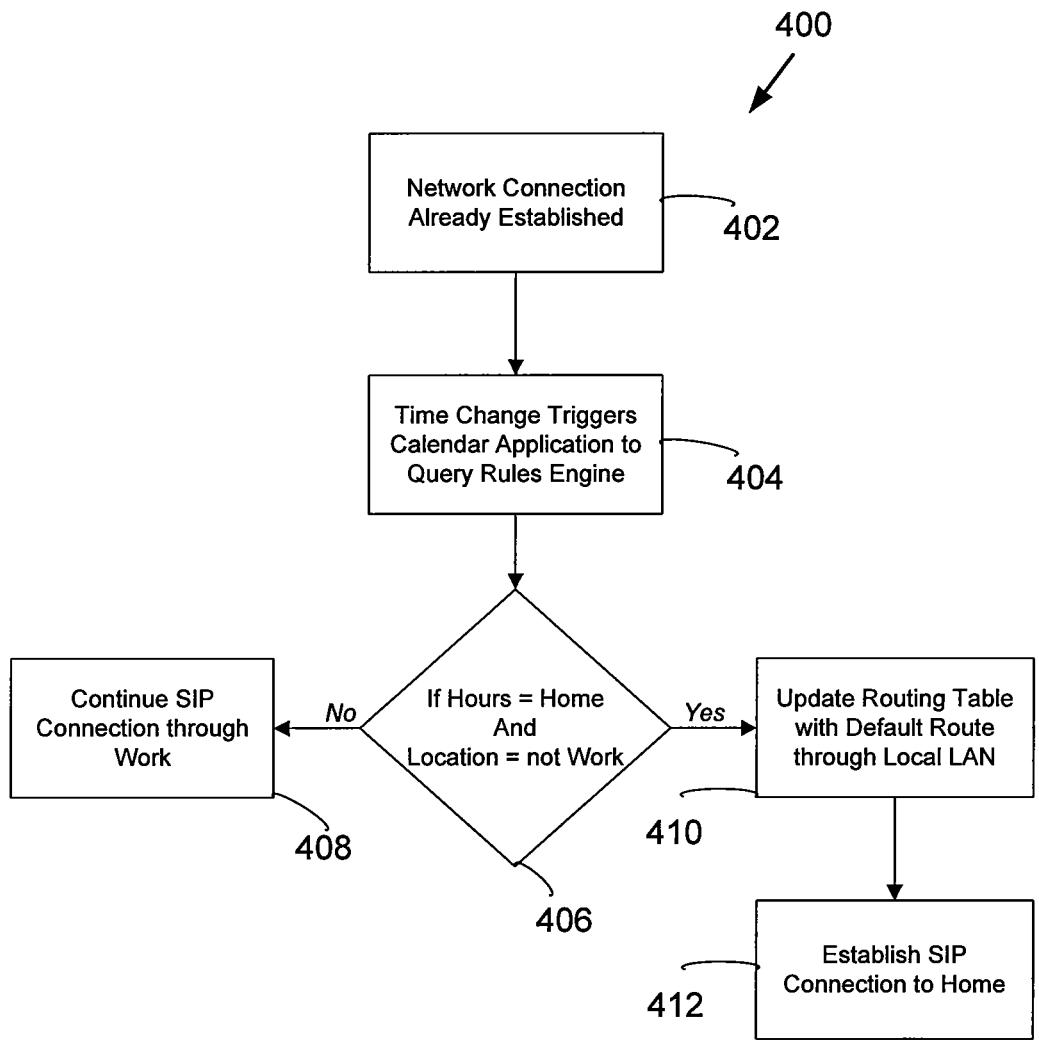

FIGS. 3 and 4 illustrate representative operations for multiple mode communications. Briefly, for a routed application such as Session Initiation Protocol (SIP) using UDP (e.g. VoIP 204A) or an HTTP application (e.g. Browser 204C) using TCP, the routing table controls how the traffic flows across the network. A time-based rule and/or a location-based rule can be formulated where during work hours, all SIP and HTTP traffic is directed through the corporate network (or a virtual private network (VPN) connection if the user is remote from work). However once work hours end, a rule could be triggered, for example, by a calendar application, to change the default route so that traffic is routed across the local LAN rather than the corporate network. If the user is at work, there could be another rule to disable this default route change.

FIG. 3 is a flowchart illustrating operations 300 updating routing table 210 on the establishment of a new connection via wireless network 106. At step 302, a WLAN network connection is establish via network 106. An IP address is obtained (step 304) and the interface state table 212 is updated (step 306). At step 308, a rule is evaluated by engine 206A. The example rule evaluates time and location information for the device 102. Other information as discussed above may be utilized in rules. FIG. 3 illustrates simplified operations, on the assumption that the device is not at the work location. At step 310, for a yes decision, where the device is not at work but it is a typical work hour, a virtual private network (VPN) connection is established via Internet 112 between the device 102 and an enterprise server (not shown). The routing table 210 is updated (step 312). At step 314 a SIP connection to the user's appropriate "work" server (e.g. an enterprise SIP server 120) is established for SIP services. If device 102 was at work, meaning within the physical confines of an office, plant or campus having appropriate access security requirements, operations may determine such information and a VPN is not likely required when connecting.

For a no decision at step 308, for example when it is not a work hour and the user's device 102 is not at work, the routing table 210 is updated (step 316). At step 318, a SIP connection to the user's appropriate "home" server (e.g. a backend server 120 providing SIP services) is established for SIP services when the user is not working.

FIG. 4 is a flowchart illustrating operations 400 for updating routing table 210 when a connection is already established (step 402) but a time event has occurred (step 404). At step 406, the rules engine evaluates a time and location based rule as per step 308. At step 408, for a no decision, the existing SIP connection through work is maintained. At step 410, for a yes decision, the routing table is updated to reference the local LAN through which the device is connecting rather than through the enterprise network and a SIP connection is establish with a server (120) providing such services when the user is at "home".

Figure 5:
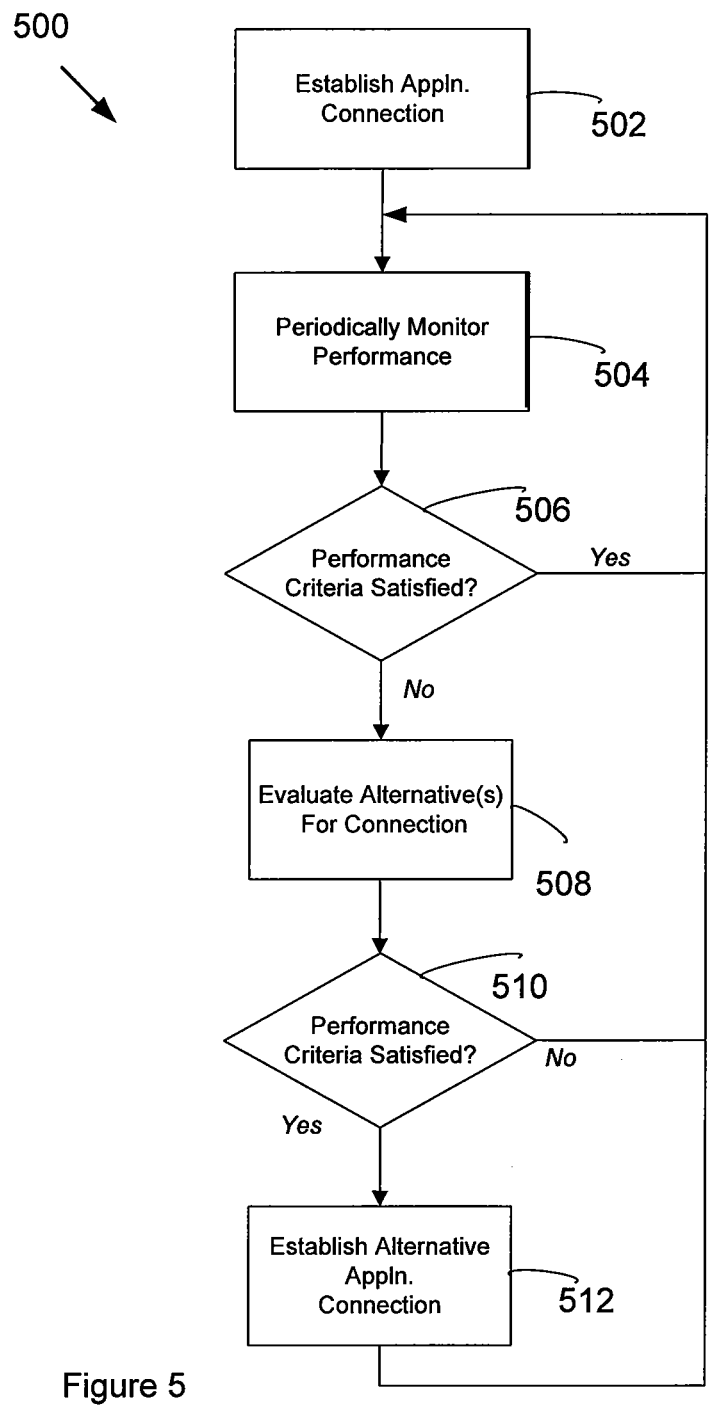

FIG. 5 illustrates operations 500 for switching access technologies when performance criteria fall below required standards that were meet at the time of establishment of the connection. At step 502, a connection is established for an application using an access technology that meets performance criteria such as may be maintained by the Rules Engine. Such an establishment may be in accordance with operations 300, for example, but need not be. The TCP/IP Stack 206B and Connection table 206C are updated accordingly.

Periodically (no specific wait period is shown), performance criteria are monitored and action taken as applicable (steps 504 and 506). If the criteria are not maintained (via No branch from step 506), alternatives for the present connection, such as an alternative access technology or different instance of the same type of access technology (e.g. a different WLAN network or subnetwork via an alternative access point, PPP connection or GSM APN) can be evaluated (step 508). If a better alternative does not exist (via No branch at step 510), operations 500 may continue (e.g. via loop back to step 504). Otherwise, a connection via a selected alternative can be established (step 512) and operations 500 continued. Concerning the frequency of monitoring (step 504), such may depend on the particular radio access technology or other indicators. It may be adaptive (such as through measuring an increase in response time between HTTP request/response, etc.) As monitoring comes with some overhead and battery consumption, skipping unnecessary 'monitor cycles' can be beneficial.

Should the first connection fail (e.g. be dropped, for example), then operations 500 may operate to choose a technology and connection that is a best available alternative to re-establish the connection using the rules engine 206A, network stack, etc. as applicable.

Should the requested service (e.g. after receiving an indication from the network, for example through receipt of a SIP 380 (Alternative Service)) indicate a need to connect using an alternative technology (e.g. due to invocation of emergency services), then operations 500 may operate to choose a technology and connection that is a best available alternative to re-establish the connection using the rules engine 206A (based on example rules that take into account the service requested (e.g. a SIP request containing a known emergency identifier)), network stack, etc. as applicable.

For some applications and in some embodiments, access technology and network stack specifics, etc., may need to be reflected in the application protocol that is using the connection. For example, SIP's P-Access-Network-Info header [RFC 3455] needs to be populated. Hence, an application may interact with the rules engine 206A (e.g. via a query or other mechanism) to acquire access network information.

Some access technology switches will result in IP address changes. If an application using the connection needs to be aware of the IP address, the change may not be transparent and may need to be communicated to (or otherwise discoverable by) the application. For example, if a tunnel destination IP address changes, such address may need to be provided to the application or any other component responsible for maintaining and advising remote agents and the like. Where an application is not aware of the IP address, the dynamic switching of the access technology can be transparent. Transparency assumes the new access technology offers similar performance service levels to the prior access technology. In other case where the differences are significant (e.g. between GSM/GPRS and WAN 802.11 technologies), an application may need to tailor its behaviour to account for the new access technology in use. Buffer sizes, retransmission timers etc. may need to be changed.

As mentioned above, Mobile IP or a constant addressing protocol may be useful for making access technology changes transparent to applications. Thus the rules engine can be use to select an initial mode of communication to establish a connection, for example, choosing among various available access technologies at run-time and for switching a mode of communication for an established connection monitoring performance or other criteria.

Figure 6:
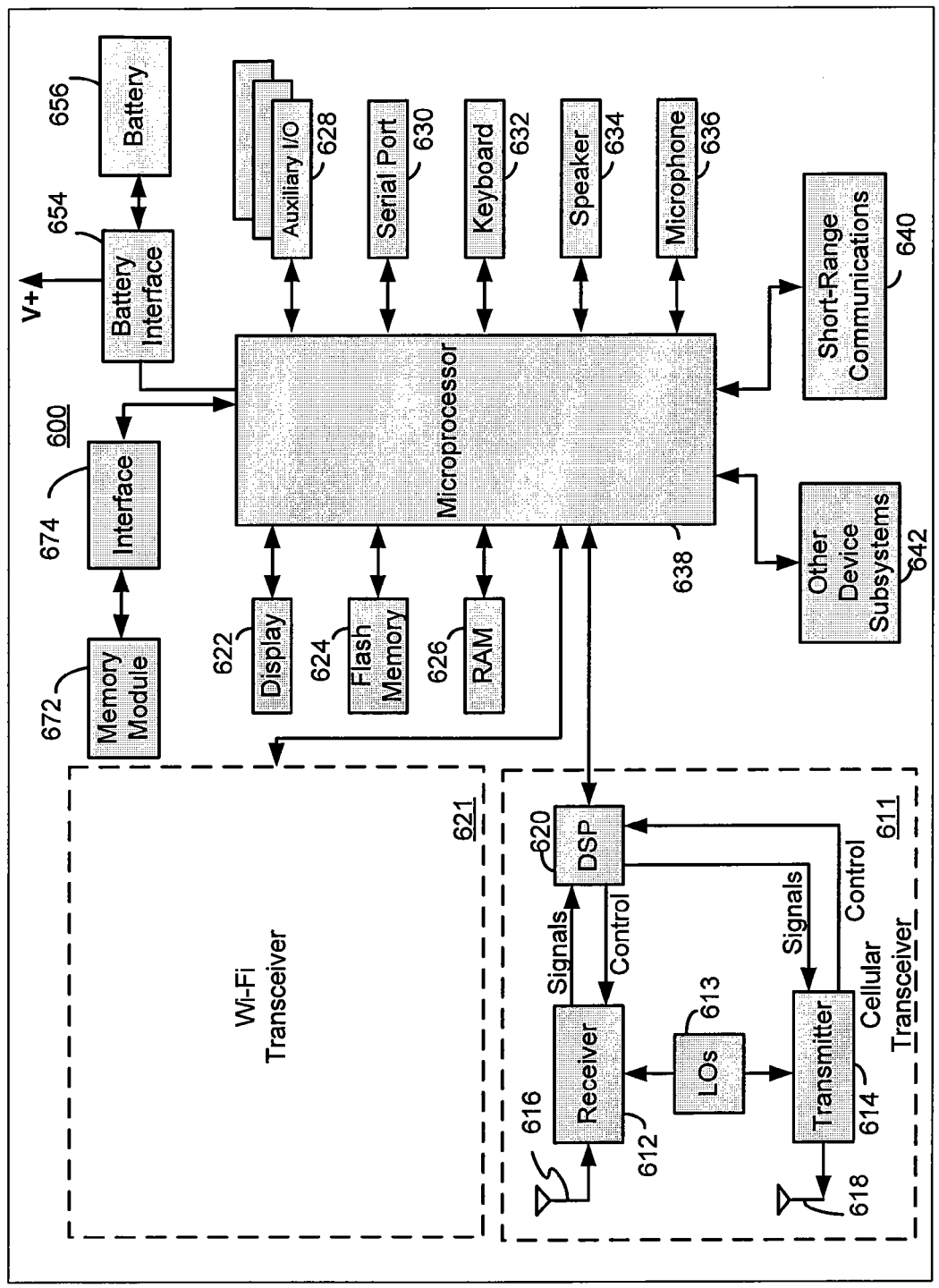
FIG. 6 is a block diagram of a representative mobile device that may be configured with multi-mode applications as described.

FIG. 6 is a detailed block diagram of an embodiment of a handheld wireless communication device 600 that may be configured as a mobile device 102 as described. Handheld device 600 is preferably a two-way communication device having at least voice and advanced data communication capabilities, including the capability to communicate with other computer systems. Depending on the functionality provided by handheld device 600, it may be referred to as a data messaging device, a two-way pager, a cellular telephone with data messaging capabilities, a wireless Internet appliance, personal digital assistant (PDA), smart phone, BlackBerry or a data communication device (with or without telephony capabilities). In the present embodiment, handheld device 600 has both Wi-Fi transceiver and cellular transceiver capabilities. As such device 600 may communicate in respect modes with any one of a plurality of access points and base station transceiver systems (not shown) within its geographic coverage area.

Handheld device 600 may incorporate a cellular transceiver (communication subsystem) 611, which includes a receiver 612, a transmitter 614, and associated components, such as one or more (preferably embedded or internal) antenna elements 616 and 618, local oscillators (LOs) 613, and a processing module such as a digital signal processor (DSP) 620. As will be apparent to those skilled in field of communications, particular design of communication subsystem 611 depends on the communication network in which handheld device 600 is intended to operate.

Handheld device 600 may send and receive communication signals over the network after required network registration, authentication or activation procedures have been completed. Signals received by antenna 616 through the network are input to receiver 612, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 620. In a similar manner, signals to be transmitted are processed, including modulation and encoding, for example, by DSP 620. These DSP-processed signals are input to transmitter 614 for digital-to-analog (D/A) conversion, frequency up conversion, filtering, amplification and transmission over communication network via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Network access is associated with a subscriber or user of handheld device 600, and therefore handheld device 600 comprises a memory module 672, memory module card or a Removable User Identity Module (R-UIM) or Subscriber Identity Module (SIM/USIM), to be inserted in or connected to an interface 674 in order to operate in the network. Alternatively, memory module 672 may be a non-volatile memory that is programmed with configuration data by a service provider so that mobile station 600 may operate in the network. Since handheld device 600 is a mobile battery-powered device, it also includes a battery interface 664 for receiving one or more rechargeable batteries 666. Such a battery 666 provides electrical power to most if not all electrical circuitry in handheld device 600, and battery interface 664 provides for a mechanical and electrical connection for it. The battery interface 664 is coupled to a regulator (not shown in FIG. 6) that provides power V+ to all of the circuitry.

Handheld device 600 may include a Wi-Fi transceiver 621 that may comprise similar components/chipsets to subsystem 611 adapted for one or more Wi-Fi protocols. Though Wi-Fi is shown, WiMAX is one alternative transceiver. In some embodiments, device 600 may be capable of both Wi-Fi and WiMAX communications in accordance with software-defined radio ("cognizant radio") techniques.

Handheld device 600 includes a microprocessor 638 that controls overall operation of mobile station 600. Communication functions, including at least data and voice communications, are performed through communication subsystem 611. Microprocessor 638 also interacts with additional device subsystems such as a display 622, a flash memory 624, a random access memory (RAM) 626, auxiliary input/output (I/O) subsystems 628, a serial port 630, a keyboard 632, a speaker 634, a microphone 636, a short-range communications subsystem 640, and any other device subsystems generally designated at 642. Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list. Operating system software used by microprocessor 638 is preferably stored in a persistent store such as flash memory 624, which may alternatively be a read-only memory (ROM) or similar storage element (not shown). Those skilled in the art will appreciate that the operating system, specific device applications or parts thereof, may be temporarily loaded into a volatile store such as RAM 626.

Microprocessor 638, in addition to its operating system functions, preferably enables execution of software applications on handheld device 600. A predetermined set of applications that control basic device operations, including at least data and voice communication applications, will normally be installed on handheld device 600 during its manufacture. A preferred application that may be loaded onto handheld device 600 may be a personal information manager (PIM) application having the ability to organize and manage data items relating to a user such as, but not limited to, e-mail, calendar events, voice mails, appointments, and task items. Naturally, one or more memory stores are available on handheld device 600 and memory module 672 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on handheld device 600 with respect to such items. This is especially advantageous where the host computer system is the mobile station user's office or enterprise computer system. Additional applications may also be loaded onto handheld device 600 through network, an auxiliary I/O subsystem 628, serial port 630, short-range communications subsystem 640, or any other suitable subsystem 642, and installed by a user in RAM 626 or preferably a non-volatile store (not shown) for execution by microprocessor 638. Such flexibility in application installation increases the functionality of handheld device 600 and may provide enhanced on-device functions, communication-related functions, or both. For example, secure communication applications may enable electronic commerce functions and other such financial transactions to be performed using handheld device 600.

In a data communication mode, a received signal such as a text message, an e-mail message, or web page download, or message according to another application 204 will be processed by applicable communication subsystem 611 or 621 and input to microprocessor 638. Microprocessor 638 will preferably further process the signal, in accordance with an associated application, for output to display 622 or alternatively to auxiliary I/O device 628. A user of handheld device 600 may also compose data items in accordance with an associated application, such as e-mail messages, for example, using keyboard 632 in conjunction with display 622 and possibly auxiliary I/O device 628. Keyboard 632 is preferably a complete alphanumeric keyboard and/or telephone-type keypad. These composed items may be transmitted over a communication network through communication subsystem 611 or 621.

For voice communications, the overall operation of handheld device 600 is substantially similar, except that the received signals would be output to speaker 634 and signals for transmission would be generated by microphone 636. Alternative voice or audio I/O subsystems, such as a voice message recording subsystem, may also be implemented. Although voice or audio signal output is preferably accomplished primarily through speaker 634, display 622 may also be used to provide an indication of the identity of a calling party, duration of a voice call, or other voice call related information, as some examples.

Serial port 630 in FIG. 6 is normally implemented in a personal digital assistant (PDA)-type communication device for which synchronization with a user's desktop computer as a desirable, albeit optional, component. Serial port 630 enables a user to set preferences through an external device or software application and extends the capabilities of handheld device 600 by providing for information or software downloads to handheld device 600 other than through a wireless communication network. The alternate download path may, for example, be used to load an encryption key onto handheld device 600 through a direct and thus reliable and trusted connection to thereby provide secure device communication. As well, it may be used as described above as a mode for applications 204.

Short-range communications subsystem 640 is an additional optional component that provides for communication between handheld device 600 and different systems or devices, which need not necessarily be similar devices. For example, subsystem 640 may include an infrared device and associated circuits and components, or a Bluetooth™ communication module to provide for communication with similarly enabled systems and devices. Bluetooth™ may be used as described above as a mode for applications 204.

Though described primarily in association with wireless mode operations, persons of ordinary skill in the art will appreciate that devices 102 may be configured for multi-mode operation selecting among different wireless modes and wired modes with suitable changes to the network infrastructure. Applications 204 may be configured for operations in accordance with multiple wireless modes, wired modes and both wireless and wired modes. Operations may be configured to select different modes of a same type of network communication as well. For example, to choose among available Wi-Fi networks or available cellular networks from different cellular service providers.

Although specific embodiments of the invention have been described herein, it will be understood by those skilled in the art that variations may be made thereto without departing from the spirit of the invention or the scope of the appended claims.

The invention claimed is:

1. A multi-mode communication device comprising:
   at least two network interfaces configured to enable the multi-mode communication device to communicate in at least two modes of communication; and
   a routing component configured to route application communications among the at least two network interfaces, said routing component configured
      using rules to select a particular network interface from among the at least two network interfaces, and,
      based upon a match between an Internet Protocol (IP) header in said application communications and an entry in the routing component, and
   said routing component configured to:
      select a first mode of communication from the at least two modes of communications in accordance with the rules to establish a connection for said application communications, configuring at least one of a routing table and a connection table to route the communications via the particular network interface in accordance with an evaluation of the rules; and
      reevaluate the rules for switching the first mode of communication to a second mode of communication of the at least two modes of communications, wherein, responsive to a particular network service requested, the first mode of communication is switched to the second mode of communication, reconfiguring at least one of the routing table and the connection table, and the connection re-established in response to receipt of a network-side originated request to switch the first mode of communication.

2. The multi-mode communication device of claim 1 wherein the routing component comprises a rules engine configurable by said rules.

3. The multi-mode communication device of claim 1 wherein the rules are responsive to a state change to at least one of Radio Access Technology type, bandwidth, cost, presence, time of day, location, application type and quality of service requirements.

4. The multi-mode communication device of claim 1 wherein the multi-mode communication device is configured to provide network address transparency to at least some of the applications in accordance with at least one of Mobile IP protocols and constant addressing techniques.

5. The muti-mode communication device of claim 1 wherein the routing component configures at least one of a routing table and connection table to route said communications via a particular network interface in accordance with the evaluation of the rules.

6. The multi-mode communication device of claim 1 wherein the multi-mode communication device is configured to define a communication application programming interface (API) for handling communications on behalf of applications, said communication API routing said communications in accordance with the routing table and connection table.

7. The multi-mode communication device of claim 1 wherein a one of said at least two modes of communication operates in accordance with a mobile telephone standard and a second of said two modes of communication operates in accordance with a wireless local area network (WLAN) standard.

8. The multi-mode communication device of claim 2 wherein the entry in the routing component comprises:
   a descriptor of the IP packet, the descriptor comprising a source IP address, a destination IP address, a local port number and a remote port number; and
   at least one factor from the set of factors comprising: Radio Access Technology type, bandwidth, cost, presence, time of day, location, application type and quality of service requirements.

9. The multi-mode communication device of claim 1 wherein the routing component is configured to provide access network information for a particular network interface selected.

10. The multi-mode communication device of claim 1 wherein the network service requested comprises emergency services.

11. The multi-mode communication device of claim 1 wherein the network-side originated request to switch modes is a SIP 380 Alternative Service response.

12. A method of multi-mode communication for a device comprising at least two network interfaces configured to communicate in at least two modes of communication, said method comprising:
   routing application communications among the at least two network interfaces
      using rules to select a particular network interface from the at least two network interfaces, and
      based upon a match between an Internet Protocol (IP) header in said application communications and an entry in a routing component, said routing comprising:
         selecting a first mode of communication from the at least two modes of communications in accordance with the rules to establish a connection for said application communications, configuring at least one of a routing table and a connection table to route the communications via the particular network interface in accordance with an evaluation of the rules; and
         reevaluating the rules for switching the first mode of communication to a second mode of communication of the at least two modes of communications, wherein, responsive to a particular network service requested, the first mode of communication is switched to the second mode of communication; reconfiguring at least one of the routing table and the connection table, and the connection re-established in response to receipt of a network-side originated request to switch the first mode of communication.

13. The method of claim 12 wherein the rules are responsive to a state change to at least one of radio access technology type, bandwidth, cost, presence, time of day, location, application type and quality of service requirements.

14. The method of claim 12 comprising providing said rules to a rules engine of a routing component.

15. The method of claim 12 comprising providing a communication application programming interface (API) for handling communications on behalf of applications, said communication API routing said communications in accordance with the routing table and connection table.

16. The method of claim 15 comprising providing network address transparency to at least some of the applications in accordance with at least one of Mobile IP protocols and constant addressing techniques.

17. The method of claim 14 wherein the entry in the routing component comprises:
- a descriptor of the IP packet, the descriptor comprising a source IP address, a destination IP address, a local port number and a remote port number; and
- at least one factor from the set of factors comprising: Radio Access Technology type, bandwidth, cost, presence, time of day, location, application type and quality of service requirements.

18. The method of claim 12 comprising providing access network information for a particular network interface selected.

19. The method of claim 12 wherein the network service requested comprises emergency services.

20. A non-transitory computer-readable storage medium having computer executable instructions stored thereon for routing communications for a device comprising at least two network interfaces configured to communicate in at least two modes of communication; and a processor for executing said computer executable instructions at runtime; said computer executable instructions operable to: route application communications among the network interfaces
- using rules to select a particular network interface from among the at least two network interfaces, and,
- based upon a match between an Internet Protocol (IP) header in said application communications and an entry in a routing component, wherein said routing comprises:
- selecting a first mode of communication from the at least two modes of communications in accordance with the rules to establish a connection for said application communications, configuring at least one of a routing table and a connection table to route the communications via the particular network interface in accordance with an evaluation of the rules; and
- reevaluating the rules for switching the first mode of communication, wherein, responsive to a particular network service requested, the first mode of communication is switched to a second mode of communication of the at least two modes of communications; reconfiguring, at least one of the routing table and the connection table, and the connection re-established in response to receipt of a network-side originated request to switch the first mode of communication.

* * * * *